United States Patent
Kawasaki et al.

(10) Patent No.: US 11,912,052 B2
(45) Date of Patent: Feb. 27, 2024

(54) THERMOSENSITIVE RECORDING MEDIUM

(71) Applicant: Nippon Paper Industries Co., Ltd., Tokyo (JP)

(72) Inventors: Kentaro Kawasaki, Tokyo (JP); Yuka Murata, Tokyo (JP); Kenji Hirai, Tokyo (JP); Yoshimi Midorikawa, Tokyo (JP)

(73) Assignee: Nippon Paper Industries Co., Ltd.

( * ) Notice: Subject to any disclaimer, the term of this patent is extended or adjusted under 35 U.S.C. 154(b) by 0 days.

(21) Appl. No.: 17/776,334

(22) PCT Filed: Nov. 11, 2020

(86) PCT No.: PCT/JP2020/042003
§ 371 (c)(1),
(2) Date: May 12, 2022

(87) PCT Pub. No.: WO2021/095751
PCT Pub. Date: May 20, 2021

(65) Prior Publication Data
US 2022/0410610 A1    Dec. 29, 2022

(30) Foreign Application Priority Data

Nov. 12, 2019 (JP) ............................... 2019-204581
Mar. 5, 2020 (JP) ............................... 2020-037464

(51) Int. Cl.
| | |
|---|---|
| B41M 5/40 | (2006.01) |
| B41M 5/42 | (2006.01) |
| B41M 5/323 | (2006.01) |
| B41M 5/333 | (2006.01) |
| C09B 7/00 | (2006.01) |
| C09B 67/20 | (2006.01) |
| B41M 5/327 | (2006.01) |
| B41M 5/48 | (2006.01) |

(52) U.S. Cl.
CPC ............. *B41M 5/42* (2013.01); *B41M 5/323* (2013.01); *B41M 5/333* (2013.01); *B41M 5/3331* (2013.01); *C09B 7/00* (2013.01); *C09B 67/0065* (2013.01); *B41M 5/327* (2013.01); *B41M 5/3275* (2013.01); *B41M 5/3333* (2013.01); *B41M 5/48* (2013.01); *B41M 2205/32* (2013.01)

(58) Field of Classification Search
CPC ........ B41M 5/333; B41M 5/42; B41M 5/323; C09B 7/00; C09B 67/0065
USPC .................................................... 428/32.39
See application file for complete search history.

(56) References Cited

U.S. PATENT DOCUMENTS

| | | | |
|---|---|---|---|
| 2016/0236496 A1 | 8/2016 | Morie et al. | |
| 2018/0022136 A1* | 1/2018 | Sakai ................... | B41M 5/3333 |
| | | | 503/218 |
| 2021/0340099 A1 | 11/2021 | Kinishi et al. | |
| 2022/0410610 A1* | 12/2022 | Kawasaki ............ | B41M 5/3333 |

FOREIGN PATENT DOCUMENTS

| | | | |
|---|---|---|---|
| JP | 2015-080852 A | † | 4/2015 |
| JP | 2015-123702 A | † | 7/2015 |
| JP | 2019-43005 | | 3/2019 |
| WO | WO 2015/050098 | | 4/2015 |
| WO | 2019-044462 A1 | | 3/2019 |
| WO | 2019/044462 A1 | † | 3/2019 |

OTHER PUBLICATIONS

English translation of International Preliminary Report on Patentability issued in corresponding International Application No. PCT/JP2020/042003 dated May 17, 2022 (6 Pages).
Extended European Search Report issued in corresponding European Application No. 20886257.3 dated Apr. 12, 2023 (9 Pages).
International Search Report corresponding to International application No. PCT/JP2020/042003 dated Jan. 7, 2021.

\* cited by examiner
† cited by third party

*Primary Examiner* — Betelhem Shewareged
(74) *Attorney, Agent, or Firm* — Harness, Dickey & Pierce, P.L.C.

(57) ABSTRACT

Provided is a thermosensitive recording medium having excellent oil resistance among various performances required for the thermosensitive recording medium. The thermosensitive recording medium has a thermosensitive recording layer comprising a colorless or pale colored electron donating leuco dye and an electron accepting color developing agent on a substrate, wherein the thermosensitive recording layer contains N-[2-(3-phenylureido)phenyl] benzenesulfonamide and an urea-based compound represented by the general formula 1 as the electron accepting color developing agents,

[Formula 1]

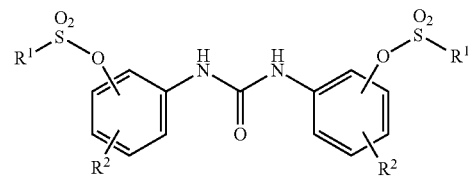

wherein $R^1$ represents a substituted or unsubstituted alkyl group, aralkyl group or aryl group, and $R^2$ represents a hydrogen atom or an alkyl group.

17 Claims, No Drawings

THERMOSENSITIVE RECORDING MEDIUM

FIELD OF THE INVENTION

The present invention relates to a thermosensitive recording medium for recording image by utilizing a coloring reaction between a colorless or pale colored electron donating leuco dye (referred to as "leuco dye") and an electron accepting color developing agent (referred to as "color developing agent"), which has excellent oil resistance.

BACKGROUND OF THE INVENTION

Thermosensitive recording media are ordinarily prepared by applying the coating solution containing the leuco dye and the color developing agent onto a substrate such as paper, synthetic paper, film, plastic and the like. Thermosensitive recording medium develops color through an instantaneous chemical reaction when heated by a thermal head, hot stamp, hot pen, laser light or the like to yield a recorded image. Such thermosensitive recording media are used extensively in recording media such as facsimile devices, computer terminal printers, automatic ticket dispensers, recorders for meters, receipts at super markets and convenience stores and the like.

In recent years, the use of the thermosensitive recording medium is expanding, such as various ticket, receipts, labels, ATM of Bank, meter reading of gas and electricity cash vouchers, such as car racing or horseracing betting. Therefore, the thermal recording body is required to have various performances such as water resistance, plasticizer resistance in the image part, thermal resistance of blank part, oil resistance, preservation of image and blank parts under harsh conditions, and the like.

In response to such demands, a thermosensitive recording medium in which water resistance, plasticizer resistance of the image part, thermal resistance of blank part, etc. are improved by using a combination of two specific types of color color developing agents (Reference 1), and a thermosensitive recording medium in which color density, whiteness, and storage stability of printed part etc. are improved by using a urea compound as a color developing agent (Reference 2) have been disclosed.

REFERENCES

Reference 1: Japanese Patent Application Public Disclosure 2015-80852
Reference 2: International Publication WO2019/044462

Problems to be Solved by the Invention

Therefore, the object of the present invention is to provide a thermosensitive recording medium having excellent oil resistance among various performances required for the thermosensitive recording medium.

Means to Solve the Problems

As a result of intensive studies, the present inventors have found that the above problems can be solved by incorporating two specific color developing agents in a thermosensitive recording layer of a thermosensitive recording medium, and then completed the present invention.

That is, the present invention provides a thermosensitive recording medium having a thermosensitive recording layer comprising a colorless or pale colored electron donating leuco dye and an electron accepting color developing agent on a substrate, wherein the thermosensitive recording layer contains N-[2-(3-phenylureido)phenyl] benzenesulfonamide and an urea-based compound represented by the general formula 1 as the electron accepting color developing agents,

[Formula 1]

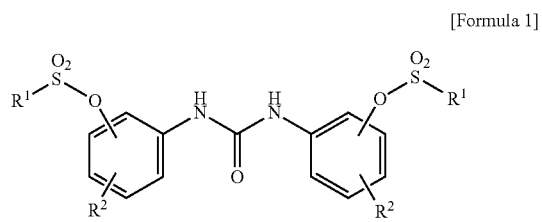

wherein $R^1$ represents a substituted or unsubstituted alkyl group, aralkyl group or aryl group, and $R^2$ represents a hydrogen atom or an alkyl group.

Advantages of the Present Invention

According to the present invention, it is possible to provide a thermosensitive recording medium having excellent oil resistance while having color-developing performance, and it is possible to provide a thermosensitive recording medium further having a good heat resistance and plasticizer resistance.

DETAILED DESCRIPTION OF THE INVENTION

The thermosensitive recording medium of the present invention is a thermosensitive recording medium having a thermosensitive recording layer comprising a colorless or pale colored electron donating leuco dye and an electron accepting color developing agent on a substrate, wherein it is characterized in that the thermosensitive recording layer contains N-[2-(3-phenylureido)phenyl] benzenesulfonamide and an urea-based compound represented by the general formula 1 as the electron accepting color developing agents.

Hereinafter, various materials used in the thermosensitive recording layer of the thermosensitive recording medium of the present invention will be illustrated, however, binders, cross-linking agents, pigments and the like can also be used for other coating layers within the range that does not impair the desired advantages on the above-mentioned problems.

The urea-based compound used in the present invention is represented by the general formula 1.

[Formula 1]

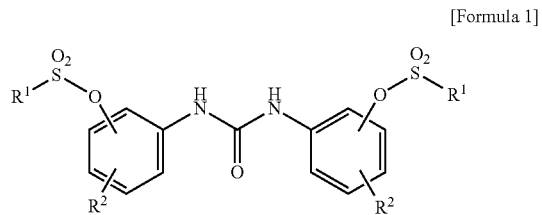

In the above general formula 1, $R^1$ represents an alkyl group, an aralkyl group or an aryl group, all of which may be substituted or unsubstituted. The alkyl group is, for example, a linear, branched or alicyclic alkyl group, preferably having 1 to 12 carbon atoms. The carbon number of the aralkyl group is preferably 7 to 12, and the carbon number of the aryl group is preferably 6 to 12. When these are substituted, the substituent is preferably an alkyl group having 1 to 12 carbon atoms, an alkoxy group having 1 to 12 carbon atoms, an aryl group having 6 to 12 carbon atoms or a halogen atom. Further, the plurality of $R^1$ may be the same or different.

The position of $R^1$—$SO_2$—O— in the benzene ring in the general formula 1 may be the same or different, and is preferably the 3-position, 4-position or 5-position.

The alkyl group includes methyl group, ethyl group, n-propyl group, iso-propyl group, n-butyl group, iso-butyl group, t-butyl group, cyclopentyl group, hexyl group, cyclohexyl group, 2-ethylhexyl group, a lauryl group and the like.

The aralkyl group may be an unsubstituted aralkyl group or an aralkyl group substituted by alkyl group, alkoxy group, aralkyl group, aryl group or halogen atom. Examples thereof include benzyl group, 1-phenylethyl group, 2-phenylethyl group, 3-phenylpropyl group, p-methylbenzyl group, m-methylbenzyl group, m-ethylbenzyl group, p-ethylbenzyl group, p-iso-propylbenzyl group, p-t-butylbenzyl group, p-methoxybenzyl group, m-methoxybenzyl group, o-methoxybenzyl group, m, p-di-methoxybenzyl group, p-ethoxy-m-methoxybenzyl group, p-phenylmethylbenzyl group, p-cumylbenzyl group, p-phenylbenzyl group, o-phenylbenzyl group, m-phenylbenzyl group, p-tolylbenzyl group, m-tolylbenzyl group, o-tolylbenzyl group and a p-chlorobenzyl group, and the like.

The aryl group may be an unsubstituted aryl group or an aryl group substituted by alkyl group, alkoxy group, aralkyl group, aryl group or halogen atom. Examples thereof include phenyl group, p-tolyl group, m-tolyl group, o-tolyl group, 2,5-dimethylphenyl group, 2,4-dimethylphenyl group, 3,5-dimethylphenyl group, 2,3-dimethylphenyl group, 3,4-dimethylphenyl group, mesitylene group, p-ethylphenyl group, p-iso-propylphenyl group, p-t-butylphenyl group, p-methoxyphenyl group, 3,4-dimethoxyphenyl group, p-ethoxyphenyl group, p-chlorophenyl group, 1-naphthyl group, 2-naphthyl group, t-butylated naphthyl group, and the like.

$R^2$ represents a hydrogen atom or an alkyl group, preferably a hydrogen atom. The alkyl group is preferably an alkyl group having 1 to 4 carbon atoms, which is, for example, methyl group, ethyl group, propyl group, isopropyl group, butyl group, isobutyl group, sec-butyl group, t-butyl group and the like.

The position of $R^2$ in the benzene ring in the general formula 1 may be the same or different, and is preferably 3-position, 4-position, or 5-position.

The urea-based compound of the present invention is preferably the urea-based compound represented by the following general formula 2.

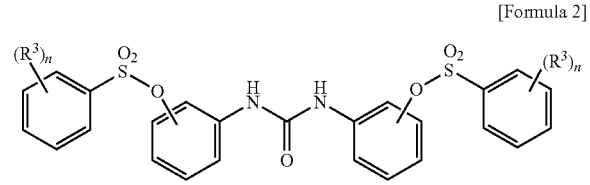

[Formula 2]

In the general formula 2, $R^3$ is alkyl group or alkoxy group, preferably alkyl group. n represents an integer of 0 to 3, preferably 0 to 2, and more preferably 0 to 1. The number of carbon atoms of the alkyl group is, for example, 1 to 12, preferably 1 to 8, and more preferably 1 to 4.

The position of $R^3$ in the benzene ring in the general formula 2 may be the same or different, and is preferably 3-position, 4-position or 5-position, more preferably 4-position.

Further, the examples of the urea-based compound used in the present invention includes, N, N'-di-[3-(benzenesulfonyloxy) phenyl] urea, N, N'-di-[3-(benzenesulfonyloxy)-4-methyl-phenyl] urea, N, N'-di-[3-(benzenesulfonyloxy)-4-ethyl-phenyl] urea, N, N'-di-[3-(benzenesulfonyloxy)-5-methyl-phenyl] urea, N, N'-di-[3-(benzenesulfonyloxy)-4-propyl-phenyl] urea, N, N'-di-[3-(o-toluenesulfonyloxy) phenyl] urea, N, N'-di-[3-(m-toluenesulfonyloxy) phenyl] urea, N, N'-di-[3-(p-toluenesulfonyloxy) phenyl] urea, N, N'-di-[3-(p-toluenesulfonyloxy)-4-methyl-phenyl] urea, N, N'-di-[3-(p-xylenesulfonyloxy) phenyl] urea, N, N'-di-[3-(m-xylenesulfonyloxy) phenyl] urea, N, N'-di-[3-(mesitylene sulfonyloxy) phenyl] urea, N, N'-di-[3-(1-naphthalenesulfonyloxy) phenyl] urea, N, N'-di-[3-(2-naphthalenesulfonyloxy) phenyl] urea, N, N'-di-[3-(p-ethylbenzenesulfonyloxy) phenyl] urea, N, N'-di-[3-(p-propylbenzenesulfonyloxy) phenyl] urea, N, N'-di-[3-(p-isopropylbenzenesulfonyloxy) phenyl] urea, N, N'-di-[3-(pt-butylbenzenesulfonyloxy) phenyl] urea, N, N'-di-[3-(p-methoxybenzenesulfonyloxy) phenyl] urea, N, N'-di-[3-(m-methoxybenzenesulfonyloxy) phenyl] urea, N, N'-di-[3-(o-methoxybenzenesulfonyloxy) phenyl] urea, N, N'-di-[3-(m, p-dimethoxybenzenesulfonyloxy) phenyl] urea, N, N'-di-[3-(p-ethoxybenzenesulfonyloxy) phenyl] urea, N, N'-di-[3-(p-propoxybenzenesulfonyloxy) phenyl] urea, N, N'-di-[3-(p-butoxybenzenesulfonyloxy) phenyl] urea, N, N'-di-[3-(p-cumylbenzylsulfonyloxy) phenyl] urea, N, N'-di-[3-(p-cumylbenzenesulfonyloxy) phenyl] urea, N, N'-di-[3-(o-phenylbenzenesulfonyloxy) phenyl] urea, N, N'-di-[3-(p-phenylbenzenesulfonyloxy) phenyl] urea, N, N'-di-[3-(p-chlorobenzenesulfonyloxy) phenyl] urea, N, N'-di-[4-(benzenesulfonyloxy) phenyl] urea, N, N'-di-[4-(p-toluenesulfonyloxy) phenyl] urea, N, N'-di-[3-(ethanesulfonyloxy) phenyl] urea, N, N'-di-[3-(benzylsulfonyloxy) phenyl] urea, and the like. However, the urea-based compound of the present invention is not limited to these.

N-[2-(3-phenylureido)phenyl] benzenesulfonamide used in the present invention is represented by the following formula 3, and is available from, for example, Nippon Soda Co., Ltd. under the trade name NKK1304.

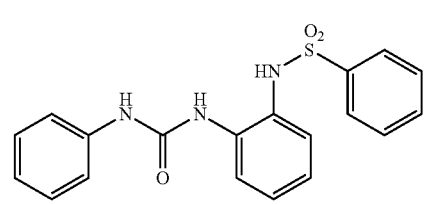

[Formula 3]

The content (in solid) of N-[2-(3-phenylureido)phenyl] benzenesulfonamide in the thermosensitive recording layer of the present invention is from 5.0 to 50.0 weight %, preferably from 5.0 to 40.0 weight %. And the content (in solid) of the urea-based compound represented by the general formula 1 in the thermosensitive recording layer is from 1.0 to 50.0 weight %, preferably from 1.0 to 40.0 weight %. The amount of N-[2-(3-phenylureido)phenyl] benzenesulfonamide in the thermosensitive recording layer of the present invention is preferably from 0.1 parts to 30.0 parts, more preferably from 0.5 parts to 25.0 parts, further preferably from 1.0 parts to 20.0 parts, further more preferably from 2.0 parts to 15.0 parts, per 1.0 part of the urea-based compound represented by the general formula 1. When the amount of N-[2-(3-phenylureido)phenyl] benzenesulfonamide in the thermosensitive recording layer is 0.1 parts or more, especially 1.0 parts or more, per 1.0 part of the urea-based compound, a thermosensitive recording medium having a superior color development sensitivity and image density and an excellent oil resistance can be obtained.

The thermosensitive recording layer of the present invention may contain color developing agent(s) other than N-[2-(3-phenylureido)phenyl] benzenesulfonamide and the urea-based compound represented by the general formula 1. As such color developing agents, for example, activated clay attapulgite, colloidal silica, inorganic acidic substances such as aluminum silicate and the like, 4,4'-isopropylidene diphenol, 1,1-bis(4-hydroxyphenyl) cyclohexane, 2,2-bis(4-hydroxyphenyl)-4-methylpentane, 4,4'-dihydroxydiphenyl sulfide, hydroquinone monobenzyl ether, benzyl 4-hydroxybenzoate, 4,4'-dihydroxy diphenyl sulfone, 2,4'-dihydroxy diphenyl sulfone, 4-hydroxy-4'-isopropoxy diphenyl sulfone, 4-hydroxy-4'-n-propoxy diphenyl sulfone, bis(3-allyl-4-hydroxyphenyl) sulfone, 4-hydroxy-4'-methyl-diphenyl sulfone, 4-hydroxyphenyl-4'-benzyloxy phenyl sulfone, 3,4-dihydroxyphenyl-4'-methyl phenyl sulfone, 1-[4-(4-hydroxyphenyl-sulfonyl) phenoxy]-4-[4-(4-isopropoxyphenyl sulfonyl) phenoxy] butane, phenol condensate composition described in Japanese Patent Application Public Disclosure No. 2003-154760, aminobenzene sulfonamide derivatives described in Japanese Patent Application Public Disclosure No. H08-59603, bis(4-hydroxyphenyl thioethoxy) methane, 1,5-di(4-hydroxyphenyl thio)-3-oxapentane, butyl bis(p-hydroxyphenyl) acetate, methyl bis(p-hydroxyphenyl) acetate, 1,1-bis(4-hydroxyphenyl)-1-phenyl ethane, 1,4-bis[α-methyl-α-(4'-hydroxyphenyl)ethyl] benzene, 1,3-bis[α-methyl-α-(4'-hydroxyphenyl)ethyl] benzene, di(4-hydroxy-3-methylphenyl) sulfide, 2,2'-thiobis(3-tert-octylphenol), 2,2'-thiobis(4-tert-octylphenol), compounds described in International Publication WO02/081229 or Japanese Patent Application Public Disclosure No. 2002-301873, thiourea compounds such as N,N'-di-m-chlorophenyl thiourea and the like, p-chlorobenzoic acid, stearyl gallate, bis[zinc 4-octyloxy carbonylamino salicylate] dihydrate, 4-[2-(p-methoxyphenoxy) ethyloxy] salicylic acid, 4-[3-(p-tolylsulfonyl) propyloxy] salicylic acid, aromatic carboxylic acids such as 5-[p-(2-p-methoxyphenoxyethoxy) cumyl] salicylic acid, and salts of these aromatic carboxylic acids and polyvalent metals such as zinc, magnesium, aluminum, calcium, titanium, manganese, tin, nickel and the like, and, furthermore, antipirin complexes of zinc thiocyanate and complex zinc salts of terephthal aldehyde acid with other aromatic carboxylic acids and the like may be cited. These color developing agents may be used individually or as a mixture of at least two of them.

1-[4-(4-hydroxyphenyl-sulfonyl) phenoxy]-4-[4-(4-isopropoxyphenyl sulfonyl) phenoxy] butane is available, for example, under the trade name of JKY-214 produced by API Corporation. The phenol condensate composition described in Japanese Patent Application Public Disclosure No. 2003-154760 is available, for example, under the trade name of JKY-224 produced by API Corporation. The compound described in International Publication WO02/081229 is available, for example, under the trade names of NKK-395 and D-100 produced by Nippon Soda Co., Ltd. In addition, high molecular weight aliphatic acid metal complex salts described in Japanese Patent Application Public Disclosure No. H10-258577 and metal chelate type color developing components such as polyvalent hydroxy aromatic compounds and the like may also be present.

Among these, it is preferable to use the urea urethane compounds represented by the following general formula 5 together with N-[2-(3-phenylureido) phenyl] benzenesulfonamide and the urea compounds represented by the general formula 1, since both color development sensitivity and storage stability (especially heat resistance) become better.

[Formula 5]

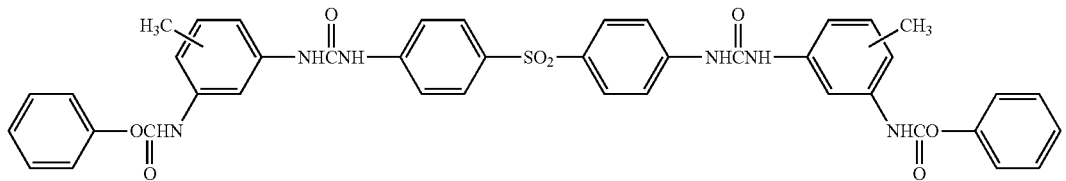

The urea-urethane-based compound, used as the color developing agent in the present invention, includes specifically three kinds of compounds represented by the following formulas, Formula 6 to Formula 8. These may be used individually or as a mixture of at least two of them.

[Formula 6]

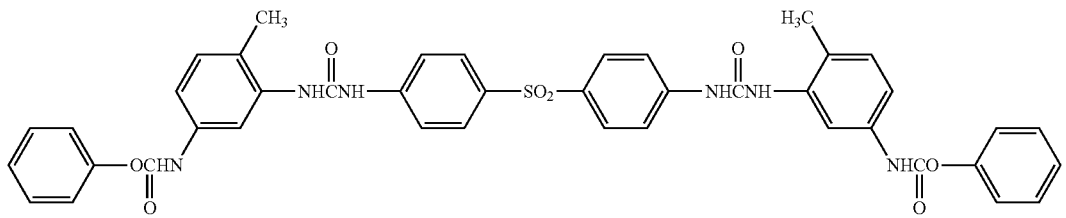

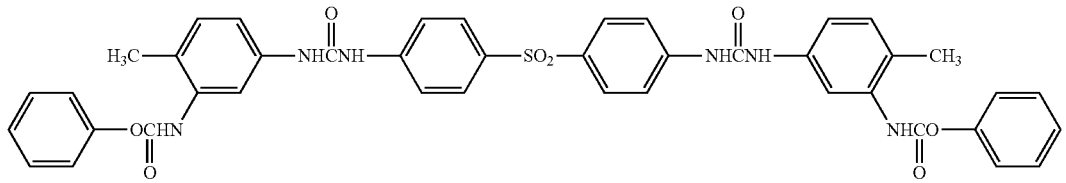

[Formula 7]

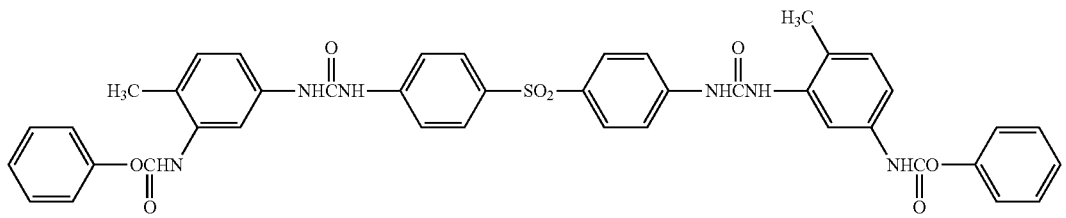

[Formula 8]

A mixture of urea urethane compounds (4,5'-bis (3-(phenoxycarbonylamino) methylphenylureido) diphenylsulfone) represented by the above chemical formula 5 is available from Fine Ace under the trade name UU.

The content (in solid) of the urea urethane compound represented by the general formula 5 in the thermosensitive recording layer is preferably from 1.0 to 50.0 weight %, more preferably from 1.0 to 40 weight %, further preferably from 5.0 to 20.0 weight %.

In the case when the thermosensitive recording layer contains color developing agent other than N-[2-(3-phenylureido)phenyl] benzenesulfonamide and the urea-based compound represented by the general formula 1, the combined amount of N-[2-(3-phenylureido)phenyl] benzenesulfonamide and the urea-based compound is preferably 50 weight % or more, more preferably 80 weight % or more, further preferably 90 weight % or more of the total amount of the color developing agents contained in the thermosensitive recording layer, which contains N-[2-(3-phenylureido)phenyl] benzenesulfonamide and the urea-based compound represented by the general formula 1.

All of the leuco dyes well known in the conventional field of pressure sensitive and thermosensitive recording media may be used as the electron donating leuco dye in the present invention. Although the leuco dye is not particularly restricted, triphenylmethane type compounds, fluorane type compounds, fluorene type compounds, divinyl type compounds and the like are preferred as the leuco dye. Specific examples of the typical colorless to pale colored basic colorless leuco dye (leuco dye precursors) are shown below. In addition, these leuco dye precursors may be used individually and also in mixtures of at least two of them.

<Triphenylmethane Type Leuco Dyes>

3,3-bis(p-Dimethyl aminophenyl)-6-dimethylaminophthalide [alternate name: crystal violet lactone] and 3,3-bis (p-Dimethyl aminophenyl) phthalide [alternate name: malachite green lactone]

<Fluorane Type Leuco Dyes>

3-Diethylamino-6-methylfluorane, 3-diethylamino-6-methyl-7-anilinofluorane, 3-diethylamino-6-methyl-7-(o,p-dimethylanilino)fluorane, 3-diethylamino-6-methyl-7-chlorofluoran, 3-diethylamino-6-methyl-7-(m-trifluoromethylanilino) fluorane, 3-diethylamino-6-methyl-7-(o-chloroanilino) fluorane, 3-diethylamino-6-methyl-7-(p-chloroanilino) fluorane, 3-diethylamino-6-methyl-7-(o-fluoroanilino) fluorane, 3-diethylamino-6-methyl-7-(m-methylanilino) fluorane, 3-diethylamino-6-methyl-7-n-octylanilino fluorane, 3-diethylamino-6-methyl-7-n-octylamino fluorane, 3-diethylamino-6-methyl-7-benzylamino fluorane, 3-diethylamino-6-methyl-7-dibenzylamino fluorane, 3-diethylamino-6-chloro-7-methyl fluorane, 3-diethylamino-6-chloro-7-anilino fluorane, 3-diethylamino-6-chloro-7-p-methylanilino fluorane, 3-diethylamino-6-ethoxyethyl-7-anilino fluorane, 3-diethylamino-7-methyl fluorane, 3-diethylamino-7-chloro fluorane, 3-diethylamino-7-(m-trifluoromethylanilino) fluorane, 3-diethylamino-7-(o-chloroanilino) fluorane, 3-diethylamino-7-(p-chloroanilino) fluorane, 3-diethylamino-7-(o-fluoroanilino) fluorane, 3-diethylamino-benz[a] fluorane, 3-diethylamino-benz[c] fluorane, 3-dibutylamino-6-methyl-fluorane, 3-dibutylamino-6-methyl-7-anilino fluorane, 3-dibutylamino-6-methyl-7-(o,p-dimethylanilino) fluorane, 3-dibutylamino-7-(o-chloroanilino) fluorane, 3-butylamino-6-methyl-7-(p-chloroanilino) fluorane, 3-dibutylamino-6-methyl-7-(o-fluoroanilino) fluorane, 3-dibutylamino-6-methyl-7-(m-fluoroanilino) fluorane, 3-dibutylamino-6-methyl-chloro fluorane, 3-dibutylamino-6-ethoxyethyl-7-anilino fluorane, 3-dibutylamino-6-chloro-7-anilino fluorane, 3-dibutylamino-6-methyl-7-p-methylanilino fluorane, 3-dibutylamino-7-(o-chloroanilino) fluorane, 3-dibutylamino-7-(o-fluoroanilino) fluorane, 3-di-n-pentylamino-6-methyl-7-anilino fluorane, 3-di-n-pentylamino-6-methyl-7-(p-chloroanilino) fluorane, 3-di-n-pentylamino-7-(m-trifluoromethylanilino) fluorane, 3-di-n-pentylamino-6-chloro-7-anilino fluorane, 3-di-n-pentylamino-7-(p-chloroanilino) fluorane, 3-pyrolidino-6-methyl-7-anilino fluorane, 3-piperidino-6-methyl-7-anilino fluorane, 3-(N-methyl-N-propylamino)-6-methyl-7-anilino fluorane, 3-(N-methyl-N-cyclohexylamino)-6-methyl-7-anilino fluorane, 3-(N-ethyl-N-cyclohexylamino)-6-methyl-7-anilino fluorane, 3-(N-ethyl-N-xylylamino)-6-methyl-7-(p-chloroanilino) fluorane, 3-(N-ethyl-p-toluidino)-6-methyl-7-anilino fluorane, 3-(N-ethyl-N-isoamylamino)-6-methyl-7-anilino fluorane, 3-(N-ethyl-N-isoamylamino)-6-chloro-7-anilino fluorane, 3-(N-ethyl-N-tetrahydrofurfurylamino)-6-methyl-7-anilino fluorane, 3-(N-ethyl-N-isobutylamino)-6-methyl-7-anilino fluorane, 3-(N-ethyl-N-ethoxypropylamino)-6-methyl-7-anilino fluorane, 3-cyclohexylamino-6-chloro fluorane, 2-(4-oxahexyl)-3-dimethylamino-6-methyl-7-anilino fluorane, 2-(4-oxahexyl)-3-diethylamino-6-methyl-7- anilino fluorane, 2-(4-oxahexyl)-3-dipropylamino-6-methyl-7-anilino fluorane, 2-methyl-6-o-(p-dimethylaminophenyl) aminoanilino fluorane, 2-methoxy-6-p-(p-dimethylaminophenyl) aminoanilino fluorane, 2-chloro-3-methyl-6-p-(p-phenylaminophenyl) aminoanilino fluorane, 2-chloro-6-p-(p-dimethylaminophenyl) aminoanilino fluorane, 2-nitro-6-p-(p-diethylaminophenyl) aminoanilino fluorane, 2-amino-6-p-(p-diethylaminophenyl) aminoanilino fluorane, 2-diethylamino-6-p-(p-diethylaminophenyl) aminoanilino fluorane, 2-phenyl-6-methyl-6-p-(p-phenylaminophenyl) aminoanilino fluorane, 2-benzyl-6-p-(p-phenylaminophenyl) aminoanilino fluorane, 2-hydroxy-6-p-(p-phenylaminophenyl)aminoanilino fluorane, 3-methyl-6-p-(p-dimethylaminophenyl) aminoanilino fluorane, 3-diethylamino-6-p-(p-diethylaminophenyl) aminoanilino fluorane, 3-diethylamino-6-p-(p-dibutylaminophenyl) aminoanilino fluorane and 2,4-dimethyl-6-[(4-dimethylamino) anilino] fluorane.

<Fluorene Type Leuco Dye>

3,6,6-Tris(dimethylamino) spiro[fluorane-9,3'-phthalide] and 3,6,6'-tris (diethylamino) spiro[fluorane-9,3'-phthalide].

<Divinyl Type Leuco Dyes>

3,3-bis-[2-(p-dimethylaminophenyl)-2-(p-methoxyphenyl) ethenyl]-4,5,6,7-tetrabromophthalide, 3,3-bis-[2-(p-dimethylaminophenyl)-2-(p-methoxyphenyl) ethenyl]-4,5,6,7-tetrachlorophthalide, 3,3-bis-[1,1-bis(4-pyrrolidinophenyl) ethylene-2-yl] 4,5,6,7-tetra-bromophthalide, 3,3-bis-[1-(4-methoxyphenyl)-1-(4-pyrrolidinophenyl) ethylene-2-yl]-4,5,6,7-tetrachlorophthalide <Others>

3-(4-Diethylamino-2-ethoxyphenyl)-3-(1-ethyl-2-methylindol-3-yl)-4-azaphthalide, 3-(4-diethylamino-2-ethoxyphenyl)-3-(1-octyl-2-methylindol-3-yl)-4-azaphthalide, 3-(4-cyclohexyl ethylamino-2-methoxyphenyl)-3-(1-ethyl-2-methylindol-3-yl)-4-azaphthalide, 3,3-bis(1-ethyl-2-methylindol-3-yl)phthalide, 3,6-bis(diethylamino)fluorane-γ-(3'-nitroanilinolactam, 3,6-bis(diethylamino)fluorane-γ-(4'-nitro) anilinolactam, 1,1-bis-[2',2',2",2"-tetrakis-(p-dimethylaminophenyl)-ethenyl]-2,2-dinitrilethane, 1,1-bis-[2',2',2",2"-tetrakis-(p-dimethylaminophenyl)-ethenyl]-2-β-naphthoylethane, 1,1-bis-[2',2',2",2"-tetrakis-(p-dimethylaminophenyl)-ethenyl]-2,2-diacetylethane and bis-[2,2,2',2'-tetrakis-(p-dimethylaminophenyl)-ethenyl]-methylmalonic acid dimethyl ester.

The previously well known sensitizers may be used as the sensitizer in the thermosensitive recording medium of the present invention. As such sensitizers, aliphatic acid amides such as stearic acid amide, palmitic acid amide and the like, ethylene bis-amide, montan acid wax, polyethylene wax, 1,2-di-(3-methylphenoxy) ethane, p-benzyl biphenyl, β-benzyloxy naphthalene, 4-biphenyl-p-tolyl ether, m-terphenyl, 1,2-diphenoxyethane, dibenzyl oxalate, di(p-chlorobenzyl) oxalate, di(p-methylbenzyl) oxalate, dibenzyl terephthalate, benzyl p-benzyloxy benzoate, di-p-tolyl carbonate, phenyl-α-naphthyl carbonate, 1,4-diethoxynaphthalene, 1-hydroxy-2-naphthoic acid phenyl ester, o-xylene-bis-(phenyl ether), 4-(m-methyl phenoxymethyl) biphenyl, 4,4'-ethylene dioxy-bis-benzoic acid dibenzyl ester, dibenzoyloxy methane, 1,2-di(3-methylphenoxy) ethylene, bis[2-(4-methoxy-phenoxy) ethyl] ether, methyl p-nitrobenzoate, phenyl p-toluene sulfonate, o-toluenesulfonamide, p-toluenesulfonamide, and the like may be listed as examples. These sensitizers may be used individually and as mixtures of at least two of them.

As a pigment used in the present invention, kaolin, calcined kaolin, calcium carbonate, aluminum oxide, titanium oxide, magnesium carbonate, aluminum silicate, magnesium silicate, calcium silicate, aluminum hydroxide, silica and the like may be used. These pigments may be used in combinations depending on the required quality.

As the binder used in the present invention, completely saponified polyvinyl alcohol, partially saponified polyvinyl alcohol, modified polyvinyl alcohols such as acetoacetylated polyvinyl alcohol, carboxyl-modified polyvinyl alcohol, amide-modified polyvinyl alcohol, sulfonic acid-modified polyvinyl alcohol, butyral-modified polyvinyl alcohol, olefin-modified polyvinyl alcohol, nitrile-modified polyvinyl alcohol, pyrolidone-modified polyvinyl alcohol, silicone-modified polyvinyl alcohol, other modified polyvinyl alcohol, hydroxyethyl cellulose, methyl cellulose, ethyl cellulose, carboxymethyl cellulose,-styrene-maleic anhydride copolymer, styrene-butadiene copolymer, cellulose derivatives such as ethyl cellulose and acetyl cellulose, casein, gum Arabic, oxidized starch, etherified starch, dialdehyde starch, esterified starch, polyvinyl chloride, polyvinyl acetate, polyacrylamide, polyacrylic acid ester, polyvinyl butylal, polystyrol and their copolymers, silicone resins, petroleum resins, terpene resins, ketone resins, cumaron resins and the like may be listed as examples. The polymeric substances may be used upon dissolving them in a solvent such as water, alcohol, ketones, esters, hydrocarbons and the like or upon emulsifying or dispersing into a paste in water or other media. These polymeric materials may also be used in combinations according to the qualities demanded.

The crosslinking agent may be used in combination in the present invention. Such crosslinking agent includes, for example, epichlorohydrin resins such as poly(amine epichlorohydrin) resins, poly(amide epichlorohydrin) resins and the like; modified modified polyamine/amide resins such as polyamide urea resins, polyalkylene polyamine resins, polyalkylene polyamide resins, polyamine polyurea resins, modified polyamine resins, modified polyamide resins, polyalkylene polyamine urea formalin resins, polyalkylene polyamine polyamide polyurea resins, and the like; glyoxal, methylol melamine, melamine formaldehyde resin, melamine urea resin, potassium persulfate, ammonium persulfate, sodium persulfate, ferric chloride, magnesium chloride, borax, boric acid, alums (aluminum potassium sulfate), ammonium chloride, and the like.

In the present invention, it is preferable to have carboxyl group-containing resins as a binder and epichlorohydrin resins and modified polyamine/amide resins as a cross-linking agent contained in the thermosensitive recording layer, since the water resistance becomes particularly better.

The reason why the water resistance becomes particularly better when the thermosensitive recording layer contains carboxyl group-containing resins as a binder and epichlorohydrin resins and modified polyamine/amide resins as a cross-linking agent is supposed as described below.

A cross-linking reaction (causing first water resistance) occurs between the carboxyl group of the carboxyl group-containing resins and the amine or amide moiety of the epichlorohydrin resins which is a cross-linking agent. Then, the crosslinking site is wrapped with the hydrophobic group of the modified polyamine/amide resins on the outside, since the hydrophilic cross-linking site formed of the carboxyl group-containing resins and the epichlorohydrin resins and the hydrophilic site of the modified polyamine/amide resins attract each other. That is, the hydrophilic cross-linking site is protected from water by the hydrophobic group (causing second water resistance). Therefore, extremely high hydrophobicity is imparted to the reaction site between the carboxyl group-containing resins and the cross-linking agent, then it is presumed that the water resistance of the thermosensitive recording medium becomes particularly better.

The carboxyl group-containing resins used in the thermosensitive recording layer of the present invention may be any one as long as it mainly has a carboxyl group. The carboxyl group-containing resins include, for example, methacrylic acid, 2-hydroxyethyl methacrylate, 2-hydroxypropyl methacrylate, dimethylaminoethyl methacrylate, glycidyl methacrylate, acrylic resins containing monofunctional acrylic monomers having carboxyl groups such as tetrahydrofrifuryl methacrylate, oxidized starch, carboxymethyl cellulose, carboxyl-modified polyvinyl alcohol with a carboxyl group introduced into polyvinyl alcohol and the like.

In particular, in the case when the carboxyl group-containing resins is carboxy-modified polyvinyl alcohol, the plasticizer resistance of the image portion and the heat resistance of the blank portion are further improved preferably. It is presumed that this is because, in addition to the above-mentioned cross-linking reaction, the cationic moiety of the modified polyamine/amide resins further cross-links with the carboxyl group of the carboxy-modified polyvinyl alcohol.

The carboxy modified poly(vinyl alcohol) for use in the thermosensitive recording layer of the present invention may be obtained in the form of a reaction product of poly(vinyl alcohol) and a polyvalent carboxylic acid such as fumaric acid, phthalic anhydride, mellitic anhydride, itaconic anhydride and the like or as esterified materials of these reaction products or, furthermore, in the form of saponified materials of the copolymers of vinyl acetate with an ethylenic unsaturated dicarboxylic acid such as maleic acid, fumaric acid, itaconic acid, crotonic acid, acrylic acid, methacrylic acid and the like. More specifically, the production processes listed as examples in Example 1 or Example 4 in, for example, Japanese Patent Application Public Disclosure S53-91995 may be cited. In addition, a degree of saponification of from 72 to 100 mole % is preferred for the carboxyl modified poly(vinyl alcohol). A degree of polymerization is preferably from 500 to 2400, more preferably 1000 to 2000.

The epichlorohydrin resins for use in the thermosensitive recording layer of the present invention is a resin characterized by containing an epoxy group in the molecule, and examples thereof include, poly(amide epichlorohydrin) resins, poly(amine epichlorohydrin) resins and the like.

The primary to quaternary amines may be used as the amine that is present in the main chain of an epichlorohydrin resin, and no particular restrictions apply. Furthermore, a degree of cationization of no greater than 5 meq/g solid (measured at pH 7) and a molecular weight of at least 500,000 are preferred from the view point of good water resistance. These epichlorohydrin resins may be used individually and as mixtures of at least two of them.

The examples of the epichlorohydrin resins include, for example, Sumirez Resin 650 (30), Sumirez Resin 675A, Sumirez Resin 6615 (the above, Sumitomo Chemical Co., Ltd.), WS4002, WS4020, WS4024, WS4030, WS4046, WS4010, CP8970 (the above, Seiko PMC Corporation).

The modified polyamine/amide resins for use in the thermosensitive recording layer of the present invention does not include those contained in the category of above epichlorohydrin resin. Such modified polyamine/amide resins include, for example, polyamide urea resins, polyalkylene polyamine resins, polyalkylene polyamide resins, polyamine polyurea resins, modified polyamine resins, modified polyamide resins, polyalkylene polyamine urea formalin resins, and polyalkylene polyamine polyamide polyurea resins.

Among these, polyamine resins are preferable, such as polyalkylene polyamine resin, polyamine polyurea resin, modified polyamine resin, polyalkylene polyamine urea formalin resin, polyalkylene polyamine polyamide polyurea tree, etc., since the water resistance becomes particularly better. These modified polyamine/amide resins may be used individually and as mixtures of at least two of them.

Examples of these modified polyamine/amide resins include Sumirez resin 302 (polyamine polyurea resin produced by Sumitomo Chemical Co., Ltd.), Sumirez resin 712 (polyamine polyurea resin produced by Sumitomo Chemical Co., Ltd.), Sumirez resin 703 (polyamine polyurea resin produced by Sumitomo Chemical Co., Ltd.), Sumirez resin 636 (polyamine polyurea resin produced by Sumitomo Chemical Co., Ltd.), Sumirez resin SPI-100 (modified polyamine resin produced by Sumitomo Chemical Co., Ltd.), Sumirez resin SPI-102A (modified polyamine resin produced by Sumitomo Chemical Co., Ltd.), Sumirez resin SPI-106N (modified polyamide resin produced by Sumitomo Chemical Co., Ltd.), Sumirez resin SPI-203(50)(Sumitomo Chemical Co., Ltd.), Sumirez resin SPI-198 (Sumitomo Chemical Co., Ltd.), PrintiveA-700 (Asahi Kasei Corporation), PrintiveA-600 (Asahi Kasei Corporation), PA6500, PA6504, PA6634, PA6638, PA6640, PA6644, PS6646, PA6654, PA6702, PA 6704 (the above, polyalkylene polyamine polyamide polyurea resins produced by Seiko PMC Corporation) and the like.

As the slipping agent used in the present invention, fatty acid metal salts such as zinc stearate, calcium stearate, and the like, waxes, silicone resins, and the like may be cited.

Stabilizing agents that improve oil resistance of recorded images and the like, such as 4,4'-butylidene (6-t-butyl-3-methylphenol), 2,2'-di-t-butyl-5,5'-dimethyl-4,4'-sulfonyl diphenol, 1,1,3-tris (2-methyl-4-hydroxy-5-cyclohexylphenyl) butane, 1,1,3-tris (2-methyl-4-hydroxy-5-t-butylphenyl) butane and the like may also be added in the range that does not adversely affect the desired effects for the problems described above.

In addition, a benzophenone type and triazole type UV absorbers, dispersion agent, de-foaming agent, antioxidant, fluorescent dye and the like may also be used.

The types and amounts of the leuco dye, color developing agent, sensitizer and other various ingredients used in the thermosensitive recording medium of the present invention may be determined according to the required performance and printability. Although the amounts of the color developing agent, the sensitizer, the pigment, the stabilizing agent and the other ingredients are not particularly restricted, from 0.5 parts to 10 parts of the color developing agent, from 0.1 parts to 10 parts of the sensitizer, from 0.5 parts to 20 parts of the pigment, from 0.01 parts to 10 parts of the stabilizing agent and from 0.01 parts to 10 parts of the other ingredients are ordinarily used per 1 part of the leuco dye. The content (in solid) of the binders in the thermosensitive recording layer is suitably around from 5 to 25 weight %.

The leuco dye, the color developing agent and the other materials added as needed are finely ground into particles with several microns or smaller in size, by using a grinder or a suitable emulsification device such as a ball mill, attritor, sand grinder and the like. The coating solutions are prepared by adding a binder and various additives to these depending on the objective. Water, alcohol and the like can be used as the solvent for the coating solution and the content (in solid) of the coating solution is about from 20 to 40 weight %.

The thermosensitive recording medium of the present invention may further have a protective layer on the thermosensitive recording layer. The protective layer comprises mainly a binder and a pigment, and the binder, the pigment, the cross-linking agent or the like described as being usable for the thermosensitive recording layer can be used.

Any binder that can be used in the thermosensitive recording layer described above can be used as the binder, but carboxy-modified polyvinyl alcohol and non-core-shell type acrylic resin are preferably used. These binders may be used solely or in combination of two or more.

Any cross-linking agent that can be used in the thermosensitive recording layer described above can be used as the cross-linking agent, and epichlorohydrin-based resin and polyamine/polyamide-based resin (excluding those categorized as epichlorohydrin-based resin) are preferably used.

It is more preferable that the protective layer contains an epichlorohydrin-based resin and a polyamine/polyamide-based resin together with a carboxy-modified polyvinyl alcohol, which further improves the color developing property.

The carboxy modified poly(vinyl alcohol) for use in the present invention is, for example, obtained in the form of a reaction product of poly(vinyl alcohol) and a polyvalent carboxylic acid such as fumaric acid, phthalic anhydride, mellitic anhydride, itaconic anhydride and the like or as esterified materials of these reaction products or, furthermore, in the form of saponified materials of the copolymers of vinyl acetate with an ethylenic unsaturated dicarboxylic acid such as maleic acid, fumaric acid, itaconic acid, crotonic acid, acrylic acid, methacrylic acid and the like. More specifically, the production processes listed as examples in Example 1 or Example 4 in, for example, Japanese Patent Application Public Disclosure S53-91995 may be cited. In addition, a degree of saponification of from 72 to 100 mole % is preferred for the carboxyl modified poly(vinyl alcohol). A degree of polymerization is preferably from 500 to 2400, more preferably 1000 to 2000.

The glass transition point (Tg) of the non-core-shell type acrylic resin is preferably 95 degree C. or lower, and further preferably 50 degree C. or higher. The Tg is measured by differential scanning calorimetry (DSC).

The non-core shell type acrylic resin contains (meth) acrylic acid and a monomer component copolymerizable with (meth) acrylic acid, and the content of the (meth) acrylic acid is preferably from 1 to 10 parts by weight per 100 parts by weight of the non-core shell type acrylic resin. (Meta) acrylic acid is alkali-soluble and has the property of making a non-core shell type acrylic resin water-soluble by adding a neutralizing agent. By making the non-core-shell type acrylic resin water-soluble, the bondability to pigments is remarkably increased, when the protective layer contains a pigment, and the protective layer with excellent strength can be formed, even when a large amount of pigment is contained. As the monomer component copolymerizable with (meth) acrylic acid, for example, alkyl acrylate resins, such as methyl (meth) acrylate, ethyl (meth) acrylate, propyl (meth) acrylate, butyl (meth) acrylate, isobutyl (meth) acrylate, pentyl (meth) acrylate, hexyl (meth) acrylate, 2-ethyl hexyl (meth)acrylate, octyl (meth) acrylate, and the like; epoxy resins; silicone resins; modified alkyl acrylate resins, such as alkyl acrylate resin modified with styrene or its derivative; (meth) acrylonitrile; acrylic acid ester; hydroxyalkyl acrylic acid ester and the like may be listed. The monomer is preferably (meta) acrylonitrile and/or methyl methacrylate.

It is preferable to formulate from 15 to 70 parts of (meth) acrylonitrile per 100 parts of the non-core shell type acrylic resin. Further, it is preferable to formulate from 20 to 80 parts of methyl methacrylate per 100 parts of a non-core shell type acrylic resin. When both (meth) acrylonitrile and methyl methacrylate are contained, It is preferable to formulate from 15 to 18 parts of (meth) acrylonitrile and from 20 to 80 parts of methyl methacrylate per 100 parts of a non-core shell type acrylic resin.

The epichlorohydrin resin is a resin characterized by containing an epoxy group in the molecule, and examples thereof include, poly(amide epichlorohydrin) resins, poly (amine epichlorohydrin) resins and the like and these can be used individually or in combinations. In addition, primary to quaternary amines may be used as the amine that is present in the main chain of an epichlorohydrin resin, and no particular restrictions apply. Furthermore, a degree of cationization of no greater than 5 meq/g solid (measured at pH 7) and a molecular weight of at least 500,000 are preferred from the view point of good water resistance. Sumirez Resin 650 (30), Sumirez Resin 675A, Sumirez Resin 6615 (the above, Sumitomo Chemical Co., Ltd.), WS4002, WS4020, WS4024, WS4030, WS4046, WS4010, CP8970 (the above, Seiko PMC Corporation) may be cited as specific examples.

The modified polyamine/amide resin does not contain epoxy group in the molecule, and examples of the modified polyamine/amide resin include polyamide urea resins, polyalkylene polyamine resins, polyalkylene polyamide resins, polyamine polyurea resins, modified polyamine resins, modified polyamide resins, polyalkylene polyamine urea formalin resins, and polyalkylene polyamine polyamide polyurea resins. These may be used individually or as mixtures of at least two of them. Specific examples of the modified polyamine/amide resin include Sumirez resin 302 (polyamine polyurea resin produced by Sumitomo Chemical Co., Ltd.), Sumirez resin 712 (polyamine polyurea resin produced by Sumitomo Chemical Co., Ltd.), Sumirez resin 703 (polyamine polyurea resin produced by Sumitomo Chemical Co., Ltd.), Sumirez resin 636 (polyamine polyurea resin produced by Sumitomo Chemical Co., Ltd.), Sumirez resin SPI-100 (modified polyamine resin produced by Sumitomo Chemical Co., Ltd.), Sumirez resin SPI-102A (modified polyamine resin produced by Sumitomo Chemical Co., Ltd.), Sumirez resin SPI-106N (modified polyamide resin produced by Sumitomo Chemical Co., Ltd.), Sumirez resin SPI-203(50)(Sumitomo Chemical Co., Ltd.), Sumirez resin SPI-198 (Sumitomo Chemical Co., Ltd.), PrintiveA-700 (Asahi Kasei Corporation), PrintiveA-600 (Asahi Kasei Corporation), PA6500, PA6504, PA6634, PA6638, PA6640, PA6644, PS6646, PA6654, PA6702, PA 6704 (the above, polyalkylene polyamine polyamide polyurea resins produced by Seiko PMC Corporation), and CP8994 (polyethyleneimine resin produced by Seiko PMC Corporation). From the viewpoint of print intensity (recording intensity), polyamine resins (polyalkylene polyamine resins, polyamine polyurea resins, modified polyamine resins, polyalkylene polyamine urea formalin resins, and polyalkylene polyamine polyamide polyurea resins) are preferable.

When the protective layer contains epichlorohydrin resins and modified polyamine/amide resins together with carboxyl group-containing resins, each content of epichlorohydrin resins and modified polyamine/amide resins is preferably from 1 to 100 parts, more preferably from 5 to 50 parts, further preferably from 10 to 40 parts per 100 parts of carboxyl group-containing resins.

As a pigment used in the protective layer, the pigments described as usable for the thermosensitive recording layer can be used, and preferably kaolin, calcined kaolin, aluminum hydroxide, silica are used. These may be used individually and as mixtures of at least two of them.

The content (in solid) of the binder in the protective layer is preferably 20 weight % or higher, more preferably from 20 to 80 weight %. When the protective layer contains pigments, the content (in solid) of binder is from 30 parts to 300 parts per 100 part of pigments.

If necessary, the coating solution for the protective layer may further contain cross-linking agents, slipping agents, stabilizers, and various auxiliary agents such as UV absorbing agents, dispersants, defoaming agents, antioxidants, fluorescent dyes, etc. that can be used for the above-mentioned thermosensitive recording layer.

The thermosensitive recording medium of the present invention may further have an undercoat layer between the support and the thermosensitive recording layer.

The undercoat layer comprises mainly a binder and a pigment.

As the binder used for the undercoat layer, commonly used water-soluble polymer or emulsion of hydrophobic polymer may be appropriately used. Specific examples include cellulose derivatives such as polyvinyl alcohol, polyvinyl acetal, hydroxyethyl cellulose, methyl cellulose, carboxymethyl cellulose, etc.; water-soluble polymers such as starch and its derivatives, sodium polyacrylic acid, polyvinylpyrrolidone, acrylic acid amide/acrylic acid ester copolymer, acrylic acid amide/acrylic acid ester/methacrylate copolymer, alkali salt of styrene/maleic anhydride copolymer, alkaliate of isobutylene/maleic anhydride copolymer, polyacrylamide, sodium alginate, gelatin, casein, etc.; emulsion of hydrophobic polymer such as polyvinyl acetate, polyurethane, styrene/butadiene copolymer, polyacrylic acid, polyacrylic acid ester, vinyl chloride/vinyl acetate copolymer, polybutyl methacrylate, ethylene/vinyl acetate copolymer, styrene/butadiene/acrylic copolymer, and the like. These may be used individually and as mixtures of at least two of them.

Any generally used pigment may be used as the pigment in the undercoat layer. As the pigment, for example, inorganic pigment, such as calcium carbonate, silica, zinc oxide, titanium oxide, aluminum hydroxide, magnesium hydroxide, calcined kaolin, clay, talc and the like may be used. These pigments may be used alone or in combination of two or more.

The amount of the pigments in the undercoat layer is ordinarily from 50 to 95 weight parts, preferably from 70 to 90 weight parts per 100 parts by weight of the total solid of the undercoat layer.

Various aids such as a dispersion agent, plasticizer, pH controlling agent, de-foaming agent, water retention agent, preservative, coloring dye, UV absorber and the like may be added to the undercoat layer, as required.

In the present invention, the method for coating the thermosensitive recording layer and other coating layers, such as protective layer and undercoat layer, is not limited in particular, but any known conventional techniques may be used. The method for coating may be appropriately selected from off-machine coating machines and on-machine coating machines, which are equipped with coaters such as air knife coater, rod blade coater, bent blade coater, bevel blade coater, roll coater, curtain coater and the like.

The coating amounts of the thermosensitive recording layer and other coating layers are not limited in particular, but may be determined according to the required performance and the recording suitability. The typical coating amount (in solid) of the thermosensitive recording layer is ordinarily in the range of from 2 to 12 $g/m^2$ and the coating amount of the protective layer is preferably in the range of from 0.5 to 5.0 $g/m^2$.

Furthermore, various technologies known in the thermosensitive recording medium field, such as a flattening treatment such as super calendaring and the like can be applied as needed after coating individual coating layers.

EXAMPLES

The following Examples illustrate the present invention, but the Examples are not intended to limit the scope of the present invention. In the following description, the terms parts and % indicate parts by weight and weight %, respectively.

The coating solutions and dispersions were prepared as described below.

[Preparation of Coating Solutions]

Undercoat layer coating solution was prepared by dispersing and stirring the following formulation:

Undercoat Layer Coating Solution

| | |
|---|---|
| Calcined kaolin (BASF Co.: Ansilex 90) | 100.0 parts |
| Styrene-butadiene copolymer latex (Zeon Corporation, ST5526, solid content: 48%) | 10.0 parts |
| Water | 50.0 parts |

Color developing agent dispersions (Solutions A1 to A4), a leuco dye dispersion (Solution B) and a sensitizer dispersion (Solution C) with the following formulations were separately wet ground using sand grinders until the average particle sizes were about 0.5 µm.

Color Developing Agent Dispersion (Solution A1)

| | |
|---|---|
| N-(2-(3-phenylureido)phenyl)benzenesulfonamide | 6.0 parts |
| Aqueous solution of completely saponified polyvinyl alcohol (Kuraray Co., Ltd., PVA117, solid content: 10%) | 5.0 parts |
| Water | 1.5 parts |

Color Developing Agent Dispersion (Solution A2)

| | |
|---|---|
| N,N'-di-[3-(p-toluenesulfonyloxy)phenyl]urea | 6.0 parts |
| Aqueous solution of completely saponified polyvinyl alcohol (PVA117) | 5.0 parts |
| Water | 1.5 parts |

Color Developing Agent Dispersion (Solution A3)

| | |
|---|---|
| Phenol compound represented by the formula 4 (Nippon Soda Co., Ltd., D90) | 6.0 parts |
| Aqueous solution of completely saponified polyvinyl alcohol (PVA117) | 5.0 parts |
| Water | 1.5 parts |

[Formula 4]

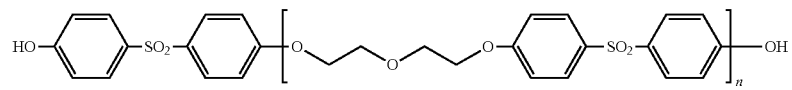

(mixture of n = 1 to 11)

Color Developing Agent Dispersion (Solution A4)

| | |
|---|---|
| Urea-urethane-based compound represented by the formula 5 (Fine Ace, UU) | 6.0 parts |
| Aqueous solution of completely saponified polyvinyl alcohol (PVA117) | 5.0 parts |
| Water | 1.5 parts |

[Formula 5]

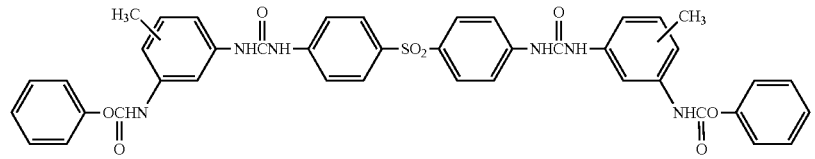

Leuco Dye Dispersion (Solution B)

| | |
|---|---|
| 3-Dibutylamino-6-methyl-7-anilinofluorane (Yamamoto Chemicals Inc., ODB-2) | 6.0 parts |
| Aqueous solution of completely saponified polyvinyl alcohol (PVA117) | 5.0 parts |
| Water | 1.5 parts |

Sensitizer Dispersion (Solution C)

| | |
|---|---|
| 1,2-bis(2-Methylphenoxy)ethane (Sanko Co. Ltd, KS232) | 6.0 parts |
| Aqueous solution of completely saponified polyvinyl alcohol (PVA117) | 5.0 parts |
| Water | 1.5 parts |

Next, these dispersions were blended in the proportion described below to prepare the thermosensitive recording layer coating solution.
Thermosensitive Recording Layer Coating Solution

| | |
|---|---|
| Color developing agent dispersion (Solution A1) | 8.0 parts |
| Color developing agent dispersion (Solution A2) | 2.0 parts |
| Leuco dye dispersion (Solution B) | 5.0 parts |
| Sensitizer dispersion (Solution C) | 3.0 parts |
| Aqueous solution of completely saponified polyvinyl alcohol (PVA117) | 25.0 parts |

Next, protective layer coating solution was prepared by mixing the following formulations:
Protective Layer Coating Solution

| | |
|---|---|
| Aluminum hydroxide dispersion (Martinsberg: Martifin OL, solid content: 50%) | 9.0 parts |
| Aqueous solution of completely saponified polyvinyl alcohol (PVA117) | 40.0 parts |
| Zinc stearate dispersion (Chukyo Yushi Co., Ltd.: HydrinZ-7-30, solid content: 30%) | 2.0 parts |
| Glyoxal (Nippon Synthetic Chemical Industry Co., Ltd., solid content: 40%) | 3.0 parts |

Example 1

The undercoat layer coating solution was applied on one side of a support (groundwood free paper with a basis weight of 47 g/m$^2$) by using a bent blade coater with a coating amount (in solid) of 10.0 g/m$^2$, and was dried to prepare an undercoated paper.
The thermosensitive recording layer coating solution was applied on the undercoat layer of the undercoated paper by using a rod blade coater with a coating amount (in solid) of 6.0 g/m$^2$ and was dried and super calendared so that the smoothness was 100-500 seconds to prepare a thermosensitive recording medium.

Example 2

A thermosensitive recording medium was prepared in the same manner as described in Example 1 using the thermosensitive recording layer coating solution with the exception of changing the amount of the color developing agent dispersion (Solution A1) to 5.0 parts, and changing the amount of the color developing agent dispersion (Solution A2) to 5.0 parts.

Example 3

A thermosensitive recording medium was prepared in the same manner as described in Example 1 using the thermosensitive recording layer coating solution with the exception of using N, N'-di-[3-(o-toluenesulfonyloxy) phenyl] urea in place of N, N'-di-[3-(p-toluenesulfonyloxy) phenyl] urea.

Example 4

A thermosensitive recording medium was prepared in the same manner as described in Example 1 using the thermosensitive recording layer coating solution with the exception of using N, N'-di-[3-(benzenesulfonyloxy) phenyl] urea in place of N, N'-di-[3-(p-toluenesulfonyloxy) phenyl] urea.

Example 5

A thermosensitive recording medium was prepared in the same manner as described in Example 1 using the thermosensitive recording layer coating solution with the exception of using N, N'-di-[3-(mesitylene sulfonyloxy) phenyl] urea in place of N, N'-di-[3-(p-toluenesulfonyloxy) phenyl] urea.

Example 6

A thermosensitive recording medium was prepared in the same manner as described in Example 1 using the thermosensitive recording layer coating solution with the exception of using N, N'-di-[3-(2-naphthalenesulfonyloxy) phenyl] urea in place of N, N'-di-[3-(p-toluenesulfonyloxy) phenyl] urea.

Example 7

A thermosensitive recording medium was prepared in the same manner as described in Example 1 using the thermosensitive recording layer coating solution with the exception of using N, N'-di-[3-(p-methoxybenzenesulfonyloxy) phenyl] urea in place of N, N'-di-[3-(p-toluenesulfonyloxy) phenyl] urea.

Example 8

A thermosensitive recording medium was prepared in the same manner as described in Example 1 using the thermosensitive recording layer coating solution with the exception of using N, N'-di-[3-(benzylsulfonyloxy) phenyl] urea in place of N, N'-di-[3-(p-toluenesulfonyloxy) phenyl] urea.

Example 9

A thermosensitive recording medium was prepared in the same manner as described in Example 1 using the thermosensitive recording layer coating solution with the exception of using N, N'-di-[3-(ethanesulfonyloxy) phenyl] urea in place of N, N'-di-[3-(p-toluenesulfonyloxy) phenyl] urea.

Example 10

A thermosensitive recording medium was prepared in the same manner as described in Example 1 using the thermosensitive recording layer coating solution with the exception of using N, N'-di-[4-(p-toluenesulfonyloxy) phenyl] urea in place of N, N'-di-[3-(p-toluenesulfonyloxy) phenyl] urea.

Example 11

A thermosensitive recording medium was prepared in the same manner as described in Example 1 using the thermosensitive recording layer coating solution with the exception of using N, N'-di-[4-(benzenesulfonyloxy) phenyl] urea in place of N, N'-di-[3-(p-toluenesulfonyloxy) phenyl] urea.

Example 12

The protective layer coating solution was applied on the thermosensitive recording layer of the thermosensitive recording layer coated paper by using a rod blade coater with a coating amount (in solid) of 3.0 g/m$^2$ and was dried and super calendared so that the smoothness was 500-1,000 seconds to prepare a thermosensitive recording medium.

Example 13

A thermosensitive recording medium was prepared in the same manner as described in Example 1 using the thermosensitive recording layer coating solution with the exception of changing the amount of the color developing agent dispersion (Solution A1) to 5.0 parts, and changing the amount of the color developing agent dispersion (Solution A2) to 5.0 parts.

Example 14

A thermosensitive recording medium was prepared in the same manner as described in Example 1 using the thermosensitive recording layer coating solution with the exception of changing the amount of the color developing agent dispersion (Solution A1) to 2.3 parts, and changing the amount of the color developing agent dispersion (Solution A2) to 7.7 parts.

Example 15

A thermosensitive recording medium was prepared in the same manner as described in Example 1 using the thermosensitive recording layer coating solution with the exception of changing the amount of the color developing agent dispersion (Solution A1) to 4.2 parts, and changing the amount of the color developing agent dispersion (Solution A2) to 5.8 parts.

Example 16

A thermosensitive recording medium was prepared in the same manner as described in Example 1 using the thermosensitive recording layer coating solution with the exception of changing the amount of the color developing agent dispersion (Solution A1) to 9.5 parts, and changing the amount of the color developing agent dispersion (Solution A2) to 0.5 parts.

Example 17

A thermosensitive recording medium was prepared in the same manner as described in Example 1 using the thermosensitive recording layer coating solution with the exception of changing the amount of the color developing agent dispersion (Solution A1) to 9.7 parts, and changing the amount of the color developing agent dispersion (Solution A2) to 0.3 parts.

Example 18

A thermosensitive recording medium was prepared in the same manner as described in Example 1 using the thermosensitive recording layer coating solution with the exception of changing the amount of the color developing agent dispersion (Solution A2) to 1.0 parts and adding 1.0 parts of the color developing agent dispersion (Solution A4).

Example 19

A thermosensitive recording medium was prepared in the same manner as described in Example 1 using the thermosensitive recording layer coating solution with the exception of changing the amount of the color developing agent dispersion (Solution A2) to 1.0 parts and adding 1.0 parts of the color developing agent dispersion (Solution A3).

Comparative Example 1

A thermosensitive recording medium was prepared in the same manner as described in Example 1 using the thermosensitive recording layer coating solution with the exception of changing the amount of the color developing agent dispersion (Solution A1) to 10.0 parts and not blending the color developing agent dispersion (Solution A2).

Comparative Example 2

A thermosensitive recording medium was prepared in the same manner as described in Example 1 using the thermosensitive recording layer coating solution with the exception of changing the amount of the color developing agent dispersion (Solution A2) to 10.0 parts and not blending the color developing agent dispersion (Solution A1).

Comparative Example 3

A thermosensitive recording medium was prepared in the same manner as described in Example 1 using the thermosensitive recording layer coating solution with the exception of adding 5.0 parts of the color developing agent dispersion (Solution A3) and not blending the color developing agent dispersion (Solution A2).

Comparative Example 4

A thermosensitive recording medium was prepared in the same manner as described in Example 1 using the thermosensitive recording layer coating solution with the exception of adding 5.0 parts of the color developing agent dispersion (Solution A3) and not blending the color developing agent dispersion (Solution A1).

The prepared thermosensitive recording media were evaluated as below.

<Color Developing Property (Recorded Density)>

A checkerboard pattern was painted on the prepared thermosensitive recording media by using a thermosensitive recording medium print tester (Okura Engineering Co., Ltd. TH-PMD equipped with a thermal head by Kyocera Co.) at applied energy of 0.35 mJ/dot and 0.41 mJ/dot and printing speed of 50 mm/sec. The density of the printed portion was measured by using Macbeth Densitometer (RD-914, with Amber filter) to evaluate the color developing property (recorded density).

<Oil Resistance>

A checkerboard pattern was painted on the prepared thermosensitive recording media by using a thermosensitive recording medium print tester (Okura Engineering Co., Ltd. TH-PMD equipped with a thermal head by Kyocera Co.) at applied energy of 0.41 mJ/dot and printing speed of 50 mm/sec. Then salad oil was applied on the printed thermosensitive recording media with a cotton swab, which was left for 24 hours. Then the density of the printed portion was measured by using Macbeth Densitometer (RD-914, with Amber filter). The residual rate was calculated from the density data before and after treatment by the formula below:

Residual rate (%)=(print density of the printed part after treatment/print density of the print part before treatment)×100

The oil resistance was evaluated according to the following criteria:

Excellent: The residual rate is 90% or higher
Good: The residual rate is 75% or higher and less than 90%
Fair: The residual rate is 50% or higher and less than 75%
Poor: The residual rate is less than 50%

If the evaluation is Excellent, Good or Fair, no problem happens in the practical use.

<Heat Resistance>

The printed surface of the prepared thermosensitive recording medium was contacted with an iron plate heated at 100 degree C. for 5 seconds. The color density of non-printed portion (i.e. blank portion) was measured by using Macbeth Densitometer (RD-914, with Amber filter) and the background color value was calculated from the difference between the color densities before and after the treatment. The heat discoloration resistance in the blank portion was evaluated on the following criteria.

Background color value=(color density of the non-printing portion after the treatment)−(color density of the non-printing portion before the treatment)

Good: The background color value is less than 0.1
Fair: The background color value is 0.1 or higher and less than 0.2
Poor: The background color value is 0.2 or higher If the evaluation is Good or Fair, no problem happens in the practical use.

<Plasticizer Resistance>

Checkerboard pattern was printed on the prepared thermosensitive recording media by using a printing tester for thermosensitive recording paper (Okura Engineering Co. LTD., TH-PMD equipped with a thermal head by Kyocera Corporation.) at recording energy of 0.41 mJ/dot and recording speed of 50 mm/sec. A paper tube was wrapped once with polyvinyl chloride wrap (Mitsui Toatsu Chemical: High Wrap KMA) and the thermosensitive recording medium was placed on the wrapped paper tube so that the recorded face is the outer face. Furthermore, the tube was wrapped 3 times with polyvinyl chloride wrap and was left standing for 24 hours under the condition of 23 degree C., 50% RH.

The record density of the recorded section was measured by using Macbeth densitometer (RD-914, with amber filter), and the residual ratio was calculated from the measured value before and after the treatment according to the following equation:

Residual ratio (%)=(record density after the treatment/record density before the treatment)×100

The plasticizer resistance was evaluated by the following criteria from the obtained residual value:

Good: The residual rate is 75% or more
Fair: The residual rate is 50% or more and less than 75%
Poor: The residual rate is less than 50%

If the evaluation is Good or Fair, there is no practical problem.

The evaluation results are shown in Table 1. The values in the table indicate the formulated amount (in parts) of the color developing agent.

TABLE 1

| | | Example 1 | Example 2 | Example 3 | Example 4 | Example 5 | Example 6 | Example 7 |
|---|---|---|---|---|---|---|---|---|
| Color developing agent in the thermosensitive recording layer | N-(2-(3-phenylureido) phenyl) benzenesulfonamide | 4.2 | 2.6 | 4.2 | 4.2 | 4.2 | 4.2 | 4.2 |
| | N,N'-di-[3-(p-toluenesulfonyloxy) phenyl] urea | 1.0 | 2.6 | — | — | — | — | — |
| | N,N'-di-[3-(o-toluenesulfonyloxy) phenyl] urea | — | — | 1.0 | — | — | — | — |
| | N,N'-di-[3-(benzenesulfonyloxy) phenyl] urea | — | — | — | 1.0 | — | — | — |
| | N,N'-di-[3-(mesitylene sulfonyloxy) phenyl] urea | — | — | — | — | 1.0 | — | — |

TABLE 1-continued

| | | | | | | | | |
|---|---|---|---|---|---|---|---|---|
| | N,N'-di-[3-(2-naphthalenesulfonyloxy) phenyl] urea | — | — | — | — | — | 1.0 | — |
| | N,N'-di-[3-(p-methoxybenzenesulfonyloxy) phenyl] urea | — | — | — | — | — | — | 1.0 |
| | N,N'-di-[3-(benzylsulfonyloxy) phenyl] urea | — | — | — | — | — | — | — |
| | N,N'-di-[3-(ethanesulfonyloxy) phenyl] urea | — | — | — | — | — | — | — |
| | N,N'-di-[4-(p-toluenesulfonyloxy) phenyl] urea | — | — | — | — | — | — | — |
| | N,N'-di-[4-(benzenesulfonyloxy) phenyl] urea | — | — | — | — | — | — | — |
| | D90 | — | — | — | — | — | — | — |
| | UU | — | — | — | — | — | — | — |
| Protective layer | | — | — | — | — | — | — | — |
| Color developing property (Recorded density) | 0.35 mJ/dot | 1.36 | 1.27 | 1.34 | 1.30 | 1.29 | 1.31 | 1.25 |
| | 0.41 mJ/dot | 1.45 | 1.37 | 1.45 | 1.43 | 1.44 | 1.44 | 1.42 |
| Oil resistance | | Excellent | Excellent | Excellent | Excellent | Excellent | Excellent | Excellent |
| Heat resistance | | Good | Fair | Good | Good | Good | Good | Good |
| Plasticizer resistance | | Good | Good | Good | Good | Good | Good | Good |

| | | Example 8 | Example 9 | Example 10 | Example 11 | Example 12 | Example 13 |
|---|---|---|---|---|---|---|---|
| Color developing agent in the thermosensitive recording layer | N-(2-(3-phenylureido) phenyl) benzenesulfonamide | 4.2 | 4.2 | 4.2 | 4.2 | 4.2 | 2.6 |
| | N,N'-di-[3-(p-toluenesulfonyloxy) phenyl] urea | — | — | — | — | 1.0 | 2.6 |
| | N,N'-di-[3-(o-toluenesulfonyloxy) phenyl] urea | — | — | — | — | — | — |
| | N,N'-di-[3-(benzenesulfonyloxy) phenyl] urea | — | — | — | — | — | — |
| | N,N'-di-[3-(mesitylenesulfonyloxy) phenyl] urea | — | — | — | — | — | — |
| | N,N'-di-[3-(2-naphthalenesulfonyloxy) phenyl] urea | — | — | — | — | — | — |
| | N,N'-di-[3-(p-methoxybenzenesulfonyloxy) phenyl] urea | — | — | — | — | — | — |
| | N,N'-di-[3-(benzylsulfonyloxy) phenyl] urea | 1.0 | — | — | — | — | — |
| | N,N'-di-[3-(ethanesulfonyloxy) phenyl] urea | — | 1.0 | — | — | — | — |
| | N,N'-di-[4-(p-toluenesulfonyloxy) phenyl] urea | — | — | 1.0 | — | — | — |
| | N,N'-di-[4-(benzenesulfonyloxy) phenyl] urea | — | — | — | 1.0 | — | — |
| | D90 | — | — | — | — | — | — |
| | UU | — | — | — | — | — | — |
| Protective layer | | — | — | — | — | installed | — |
| Color developing property (Recorded density) | 0.35 mJ/dot | 1.33 | 1.34 | 1.30 | 1.35 | 1.27 | 1.24 |
| | 0.41 mJ/dot | 1.42 | 1.41 | 1.43 | 1.45 | 1.37 | 1.34 |
| Oil resistance | | Excellent | Excellent | Excellent | Excellent | Excellent | Excellent |
| Heat resistance | | Good | Good | Good | Good | Good | Good |
| Plasticizer resistance | | Good | Good | Good | Good | Good | Good |

| | | Example 14 | Example 15 | Example 16 | Example 17 | Example 18 | Example 19 |
|---|---|---|---|---|---|---|---|
| Color developing agent in the thermosensitive recording layer | N-(2-(3-phenylureido) phenyl) benzenesulfonamide | 1.2 | 2.2 | 4.94 | 5.04 | 4.2 | 4.2 |
| | N,N'-di-[3-(p-toluenesulfonyloxy) phenyl] urea | 4.0 | 3.0 | 0.26 | 0.16 | 0.5 | 0.5 |

TABLE 1-continued

| | | | | | | | | |
|---|---|---|---|---|---|---|---|---|
| | N,N'-di-[3-(o-toluenesulfonyloxy) phenyl] urea | | — | — | — | — | — | — |
| | N,N'-di-[3-(benzenesulfonyloxy) phenyl] urea | | — | — | — | — | — | — |
| | N,N'-di-[3-(mesitylene sulfonyloxy) phenyl] urea | | — | — | — | — | — | — |
| | N,N'-di-[3-(2-naphthalenesulfonyloxy) phenyl] urea | | — | — | — | — | — | — |
| | N,N'-di-[3-(p-methoxybenzenesulfonyloxy) phenyl] urea | | — | — | — | — | — | — |
| | N,N'-di-[3-(benzylsulfonyloxy) phenyl] urea | | — | — | — | — | — | — |
| | N,N'-di-[3-(ethanesulfonyloxy) phenyl] urea | | — | — | — | — | — | — |
| | N,N'-di-[4-(p-toluenesulfonyloxy) phenyl] urea | | — | — | — | — | — | — |
| | N,N'-di-[4-(benzenesulfonyloxy) phenyl] urea | | — | — | — | — | — | — |
| | D90 | | — | — | — | — | — | 0.5 |
| | UU | | — | — | — | — | 0.5 | — |
| | Protective layer | | — | — | — | — | — | — |
| | Color developing property | 0.35 mJ/dot | 1.21 | 1.23 | 1.32 | 1.30 | 1.37 | 1.33 |
| | (Recorded density) | 0.41 mJ/dot | 1.30 | 1.32 | 1.43 | 1.42 | 1.46 | 1.39 |
| | Oil resistance | | Excellent | Excellent | Good | Good | Excellent | Excellent |
| | Heat resistance | | Fair | Fair | Good | Good | Good | Fair |
| | Plasticizer resistance | | Good | Good | Fair | Fair | Good | Good |

| | | | Comparative Example 1 | Comparative Example 2 | Comparative Example 3 | Comparative Example 4 |
|---|---|---|---|---|---|---|
| Color developing agent in the thermosensitive recording layer | N-(2-(3-phenylureido) phenyl) benzenesulfonamide | | 5.2 | — | 2.6 | — |
| | N,N'-di-[3-(p-toluenesulfonyloxy) phenyl] urea | | — | 5.2 | — | 2.6 |
| | N,N'-di-[3-(o-toluenesulfonyloxy) phenyl] urea | | — | — | — | — |
| | N,N'-di-[3-(benzenesulfonyloxy) phenyl] urea | | — | — | — | — |
| | N,N'-di-[3-(mesitylene sulfonyloxy) phenyl] urea | | — | — | — | — |
| | N,N'-di-[3-(2-naphthalenesulfonyloxy) phenyl] urea | | — | — | — | — |
| | N,N'-di-[3-(p-methoxybenzenesulfonyloxy) phenyl] urea | | — | — | — | — |
| | N,N'-di-[3-(benzylsulfonyloxy) phenyl] urea | | — | — | — | — |
| | N,N'-di-[3-(ethanesulfonyloxy) phenyl] urea | | — | — | — | — |
| | N,N'-di-[4-(p-toluenesulfonyloxy) phenyl] urea | | — | — | — | — |
| | N,N'-di-[4-(benzenesulfonyloxy) phenyl] urea | | — | — | — | — |
| | D90 | | — | — | 2.6 | 2.6 |
| | UU | | — | — | — | — |
| Protective layer | | | — | — | — | — |
| Color developing property | | 0.35 mJ/dot | 1.23 | 1.16 | 1.18 | 1.08 |
| (Recorded density) | | 0.41 mJ/dot | 1.34 | 1.31 | 1.32 | 1.26 |
| Oil resistance | | | Poor | Fair | Fair | Fair |
| Heat resistance | | | Fair | Poor | Poor | Poor |
| Plasticizer resistance | | | Poor | Poor | Fair | Fair |

What is claimed is:

1. A thermosensitive recording medium having a thermosensitive recording layer comprising a colorless or pale colored electron donating leuco dye and an electron accepting color developing agent on a substrate, wherein the thermosensitive recording layer contains N-[2-(3-phenylureido)phenyl] benzenesulfonamide and an urea-based compound represented by the general formula 1 as the electron accepting color developing agents,

[Formula 1]

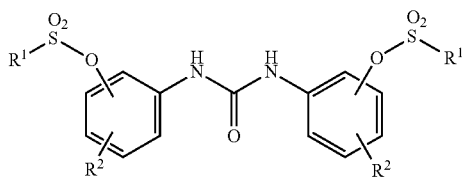

wherein $R^1$ represents a substituted or unsubstituted alkyl group, aralkyl group or aryl group, and $R^2$ represents a hydrogen atom or an alkyl group, and wherein the content of N-[2-(3-phenylureido)phenyl] benzenesulfonamide is from 0.1 to 15.0 parts by weight per 1.0 part by weight of the urea-based compound represented by the general formula 1.

2. The thermosensitive recording medium of claim 1, wherein the urea-based compound is represented by the general formula 2,

[Formula 2]

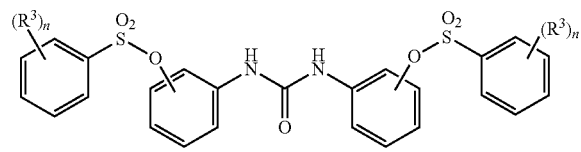

wherein $R^3$ represents an alkyl group or an alkoxy group, and n represents an integer of 0 to 3.

3. The thermosensitive recording medium of claim 2, wherein $R^3$ represents an alkyl group having 1 to 4 carbon atoms, n represents an integer of 0 to 1, and $R^3$ is at 4-position in the benzene ring.

4. The thermosensitive recording medium of claim 1, wherein the content (in solid) of N-[2-(3-phenylureido) phenyl] benzenesulfonamide in the thermosensitive recording layer is 5.0 to 50.0 weight %.

5. The thermosensitive recording medium of claim 1, wherein the content (in solid) of the urea-based compound in the thermosensitive recording layer is from 1.0 to 50.0 weight %.

6. The thermosensitive recording medium of claim 1, wherein the thermosensitive recording layer includes color developing agent(s) other than N-[2-(3-phenylureido)phenyl] benzenesulfonamide and the urea-based compound represented by the general formula 1, and the combined amount of N-[2-(3-phenylureido)phenyl] benzenesulfonamide and the urea-based compound is 90 weight % or more of the total amount of the color developing agents contained in the thermosensitive recording layer.

7. The thermosensitive recording medium of claim 1, wherein further a protective layer is installed on the thermosensitive recording layer.

8. The thermosensitive recording medium of claim 1, wherein the thermosensitive recording layer further contains an urea-urethane-based compound represented by the general formula 5 as the electron accepting color developing agent.

[Formula 5]

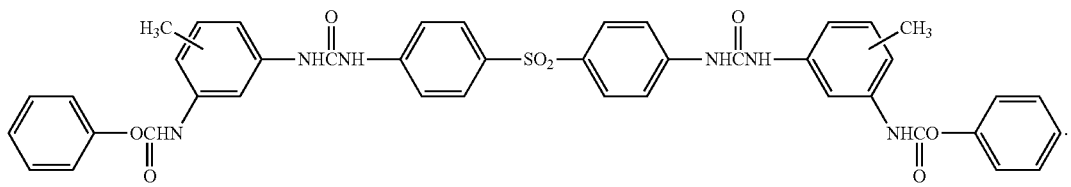

9. The thermosensitive recording medium of claim 8, wherein the content (in solid) of the urea-urethane-based compound in the thermosensitive recording layer is from 5 to 20 weight %.

10. The thermosensitive recording medium of claim 2, wherein the content (in solid) of N-[2-(3-phenylureido) phenyl] benzenesulfonamide in the thermosensitive recording layer is 5.0 to 50.0 weight %.

11. The thermosensitive recording medium of claim 2, wherein the content (in solid) of the urea-based compound in the thermosensitive recording layer is from 1.0 to 50.0 weight %.

12. The thermosensitive recording medium of claim 2, wherein the thermosensitive recording layer includes color developing agent(s) other than N-[2-(3-phenylureido)phenyl] benzenesulfonamide and the urea-based compound represented by the general formula 1, and the combined amount of N-[2-(3-phenylureido)phenyl] benzenesulfonamide and the urea-based compound is 90 weight % or more of the total amount of the color developing agents contained in the thermosensitive recording layer.

13. The thermosensitive recording medium of claim 2, wherein further a protective layer is installed on the thermosensitive recording layer.

14. The thermosensitive recording medium of claim 2, wherein the thermosensitive recording layer further contains an urea-urethane-based compound represented by the general formula 5 as the electron accepting color developing agent.

[Formula 5]

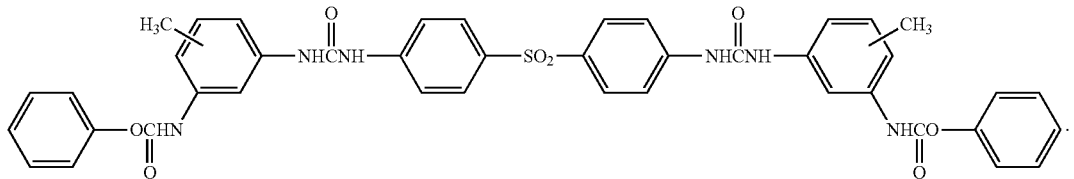

15. The thermosensitive recording medium of claim 3, wherein the content (in solid) of N-[2-(3-phenylureido)phenyl] benzenesulfonamide in the thermosensitive recording layer is from 5.0 to 50.0 weight %.

16. The thermosensitive recording medium of claim 3, wherein the content (in solid) of the urea-based compound in the thermosensitive recording layer is from 1.0 to 50.0 weight %.

17. The thermosensitive recording medium of claim 3, wherein the thermosensitive recording layer includes color developing agent(s) other than N-[2-(3-phenylureido)phenyl] benzenesulfonamide and the urea-based compound represented by the general formula 1, and the combined amount of N-[2-(3-phenylureido)phenyl] benzenesulfonamide and the urea-based compound is 90 weight % or more of the total amount of the color developing agents contained in the thermosensitive recording layer.

* * * * *